United States Patent [19]

Hsu

[11] Patent Number: 5,761,282
[45] Date of Patent: Jun. 2, 1998

[54] MULTI-USER PERSONAL MESSAGE TRANSMITTING AND RECEIVING SYSTEM

[76] Inventor: Peter Hsu, 2F, No. 46, Lane 245 Sec. 3, Kang Ning Rd., Nei Hwu, Taipei, Taiwan

[21] Appl. No.: 565,322

[22] Filed: Nov. 30, 1995

Related U.S. Application Data

[63] Continuation-in-part of Ser. No. 278,425, Jul. 21, 1994, abandoned.

[51] Int. Cl.⁶ .................................................. H04M 11/00
[52] U.S. Cl. ........................... 379/100.05; 379/100.06; 379/67; 358/438; 358/468
[58] Field of Search .................. 379/100, 96–98, 379/102, 104, 105, 67, 100.03, 100.05, 100.06, 100.08, 100.09, 93.17, 93.26, 93.28, 102.01, 102.02; 358/400, 401, 403, 405, 407, 434–436, 442, 440, 468, 438, 439

[56] References Cited

U.S. PATENT DOCUMENTS

| | | | |
|---|---|---|---|
| 4,785,355 | 11/1988 | Matsumoto | 379/100 |
| 4,932,042 | 6/1990 | Baral et al. | 379/100 |
| 4,935,955 | 6/1990 | Neudorfer | 379/100 |
| 4,994,926 | 2/1991 | Gordon et al. | 379/100 |
| 5,206,743 | 4/1993 | Hochman et al. | 358/440 |
| 5,270,833 | 12/1993 | Kubokawa et al. | 379/100 |
| 5,287,199 | 2/1994 | Zoccolillo | 379/100 |
| 5,317,628 | 5/1994 | Misholi et al. | 379/100 |
| 5,351,136 | 9/1994 | Wu et al. | 358/440 |

Primary Examiner—Wing F. Chan
Attorney, Agent, or Firm—Bucknam and Archer

[57] ABSTRACT

A multi-user personal message transmitting and receiving system utilizing a conventional facsimile machine, a conventional facsimile machine having line connections to the input/output port of a computer, a conventional paperless facsimile machine with memory for document storage, a MODEM equipped computer, or a conventional answering machine with mass memory for message storage. A dual tone multi-frequency decoder (DTMF receiver) is connected to the telephone network of the machine or computer utilized and a voice synthesizer is connected to the telephone network advising the caller on the telephone line concerning the personal information codes of the users of the system or advising the caller to enter the personal information code of the particular user prior to transmitting the message. A coding system is built into the central processing unit of the machine or computer utilized for setting and storing the individual user personal information codes and corresponding personal confidential codes and recognizing the incoming code preceding an incoming message. When the incoming code is recognized as one of the stored personal information codes, the coding system controls the automatic reception and storage of the incoming message in the respective code area of the memory which can be retrieved by the respective user by entering the respective personal confidential code.

7 Claims, 5 Drawing Sheets

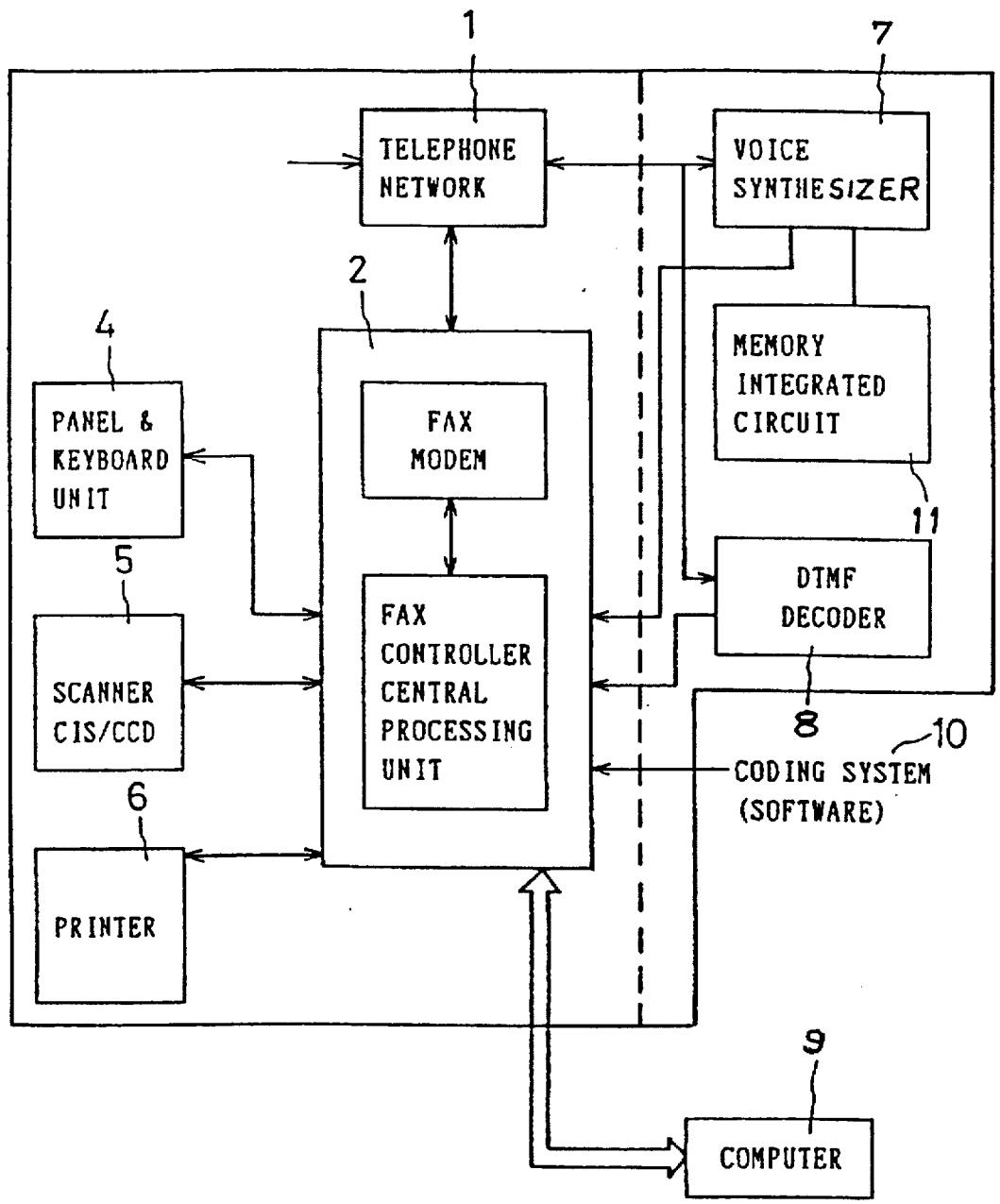
F I G. 3

MULTI-USER PERSONAL MESSAGE TRANSMITTING AND RECEIVING SYSTEM

This application is a Continuation-in-part of U.S. Ser. No. 08/278,425 filed Jul. 21, 1994 abandoned.

FIELD OF THE INVENTION

This invention relates to fax machines which do not require the thermopaper conventionally used and, more particularly, it relates to fax machines which have multi-users and which store received messages in memory to be retrieved only by the authorized user. Furthermore, the present invention extends such application to personal computers and answering machines.

BACKGROUND OF THE INVENTION

Many fax machines have been described and have appeared on the market. These fax machines have become more and more popular because they offer the advantage of being capable of transmitting and receiving graphic matter. However, a fax machine uses thermopaper for the production of graphic matter of the message. In recent years, computers have been used with fax machines to receive and store graphic matter and also a type of paperless fax machine having memory storage is required when the thermopaper is exhausted, or to store input documents which are prepared to be transmitted automatically.

A drawback of conventional fax machines is that the user may not be able to avoid confidential documents being seen by those who should not have access to them.

SUMMARY OF THE INVENTION

An object of the present invention is to provide a solution to the drawback mentioned hereinabove. According to the present invention, a voice synthesizer as an outgoing message generator, and a dual tone multi-frequency decoder (DTMF Receiver) are provided in a paperless facsimile machine system, and a coding system is built into the central processing unit of the paperless facsimile machine system. In this manner, the central processing unit controls the paperless facsimile machine system to receive and identify incoming codes of incoming messages over the telephone line, then automatically stores the incoming message in respective code in the memory (data bank) of the paperless facsimile machine system. The individual user of the paperless facsimile machine system can retrieve the stored incoming message by entering a personal confidential code.

The paperless facsimile machine system of the present invention comprises a confidential facsimile machine equipped with memory means for storing the incoming message. A conventional facsimile machine may also be used having a line connection to the input/output port of a computer for storing the incoming messages in the storage system of the computer or a conventional paperless facsimile machine may be used. Also, a computer equipped with a modulator/demodulator (MODEM) of fax/data or fax/data/ voice may be used.

Further, the voice synthesizer and the dual tone multi-frequency decoder and the coding system can be built into a telephone answering machine to receive, store and retrieve incoming personal voice message.

BRIEF DESCRIPTION OF THE DRAWINGS

FIG. 3 is a block diagram of the present invention on conventional facsimile machine, having line connection to the input/output port of a computer.

DETAILED DESCRIPTION OF THE PREFERRED EMBODIMENT

An example of the present invention with a paperless facsimile machine is described hereinbelow.

Figure 1:
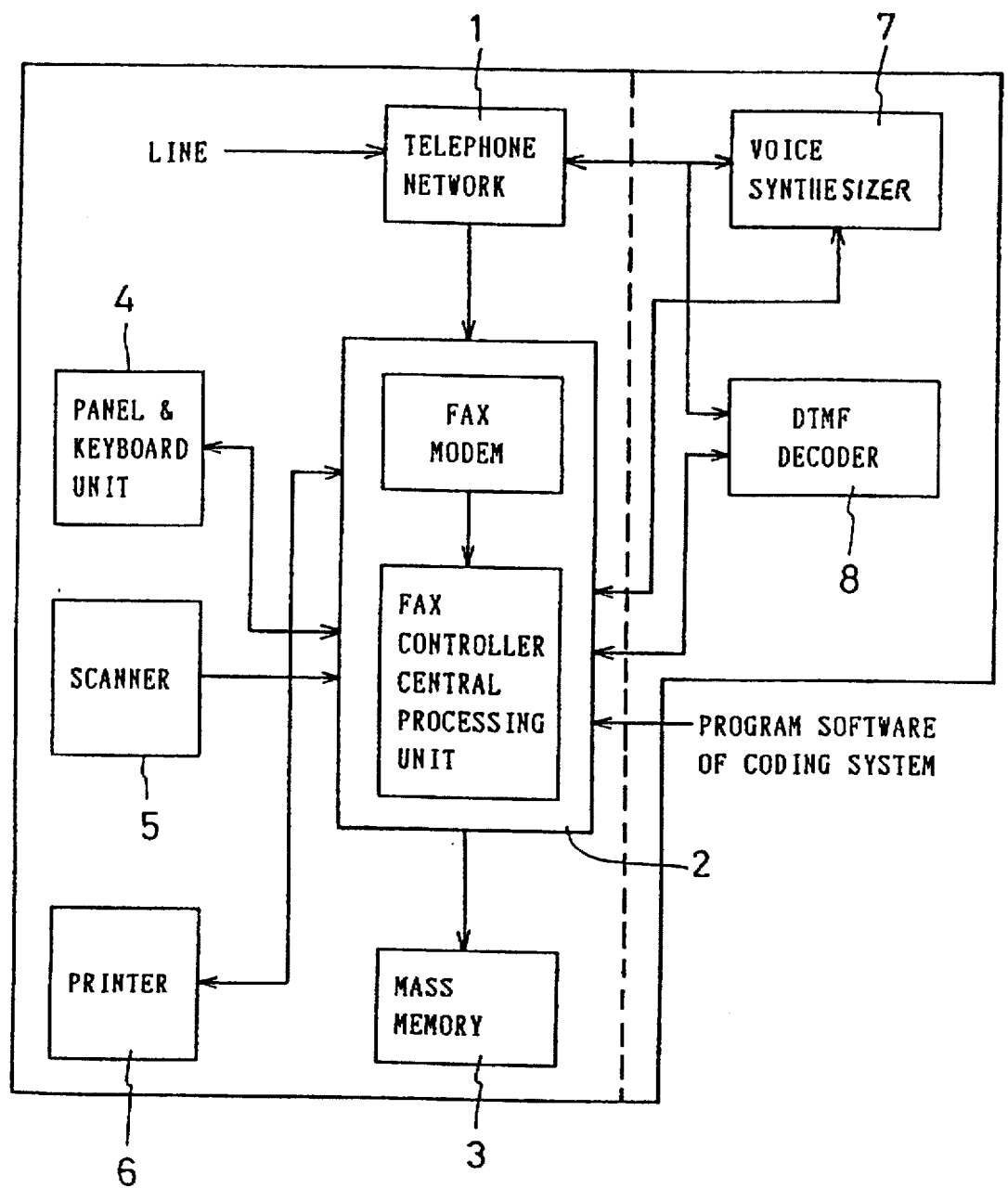
FIG. 1 is a block diagram of the present invention on conventional paperless facsimile machine.

Referring to FIG. 1, the blocks shown at the left of the dotted line show the structure of a conventional paperless fax machine. An incoming message from the telephone line is transmitted into the fax modem/controller 2 which contains the central processing unit, and is stored in memory 3 (mass). A panel and keyboard unit 4, a scanner 5 and a printer 6 are connected respectively to the fax modem/controller 2. Therefore, the user can retrieve a stored message from memory 3 through the operation on the panel and keyboard unit 4, and the printer 6 prints out.

The preferred embodiment of the present invention comprises the installation of voice synthesizer 7 as an outgoing message generator, a DTMF decoder (DTMF receiver) 8 and a coding system on conventional paperless facsimile machine. The voice synthesizer 7 is connected between the telephone network 1 and fax modem/controller 2. The DTMF decoder (DTMF receiver) 8 is further connected to the telephone network 1. The coding system is built into the central processing unit of the fax modem/controller 2, which has a plurality of sets of personal codes for individual use of the present invention, and can identify said personal codes.

As stated hereinabove, one object of the present invention is to protect personal messages from being exposed to the public. Therefore, data receiving and retrieving procedures are made through a code and a corresponding code address is set up in the data bank of memory 3. The code means: a personal information code and a personal confidential code as the personal codes shown in FIG. 2. The personal information code is the code number to be identified by the coding system for specific personal message stored in memory. The personal confidential code is a private code set by the individual user for retrieving a stored personal message.

Figure 2:
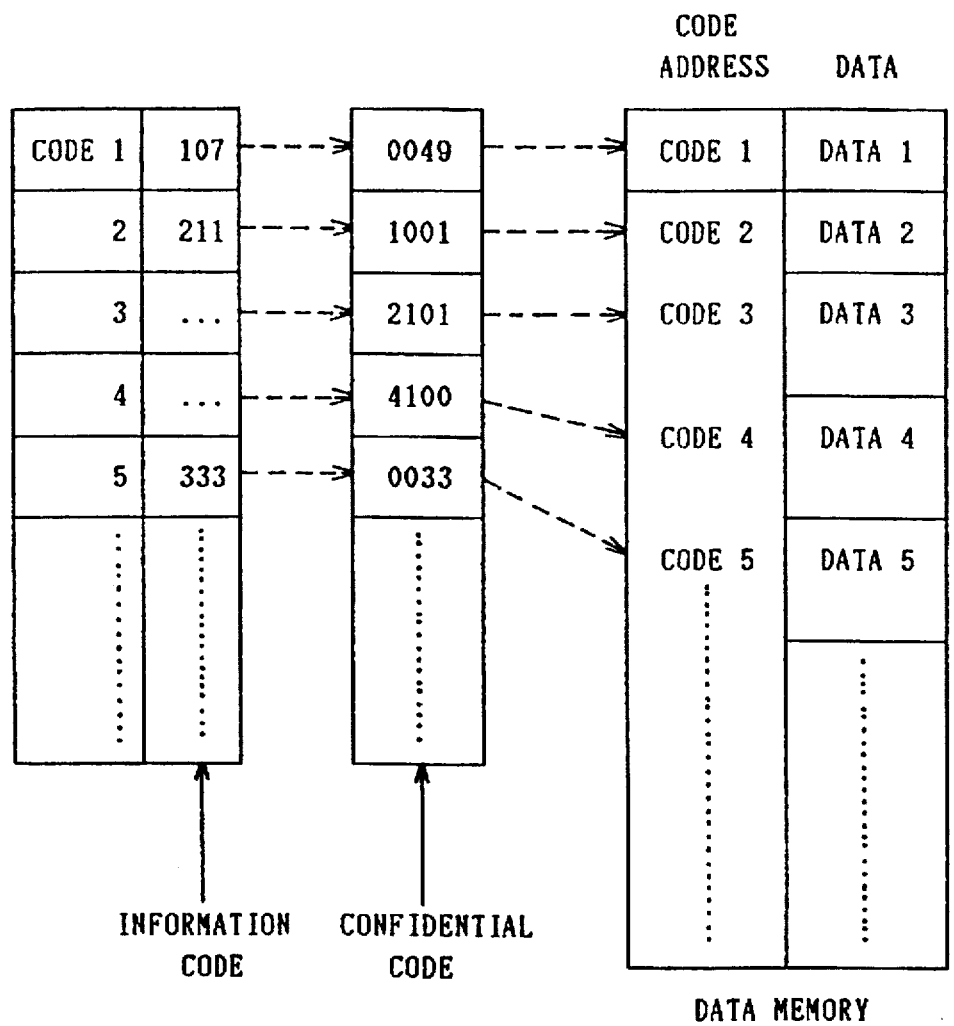
FIG. 2 shows the coding of data according to the present invention.

Referring to FIGS. 1 and 2, after the system has been properly set with the personal code entered through the panel and keyboard unit 4, the system enters the stand-by status. When the telephone line is triggered and hooked off, the voice synthesizer 7 automatically tells the calling party about the message in either of the following two ways:

1) Please transmit or key in the assigned code (personal information code) and start the transmission after the beep sound; or 2) Please transmit or key in code number xxx if to send to Mr. A and then start the transmission.

After the caller enters the incoming code, the system automatically enters the paperless receiving mode, and the received data are immediately stored in the memory 3 without passing through the printer 6. At the same time, the LCD display shows the storing of incoming code. When searching the keys, the LCD shows which personal information code had data stored in and the individual user having the personal information code can retrieve the stored data only when his confidential code is input through the keyboard or over the telephone line from a remote location.

Every individual user can set personal codes through the panel and keyboard 4. When the system is turned to the function of setting the code, a personal information code is keyed in and then the personal confidential code corresponding to the personal information code is keyed in. The central processing unit of the fax modem/controller 2 is installed with a coding software and could set a plural list of sets of personal codes.

The system of the present invention is initially in a stand-by status. When the code input from the calling party is identified, the fax modem/controller 2 is turned to auto-receiving and, if the calling party executes a transmission as normal without the code input, the paperless facsimile machine will receive as normal to print the message out.

According to one embodiment of the present invention regarding the construction of voice synthesizer 7 and DTMF decoder (DTMF receiver) 8, the description is as follows:

The voice synthesizer 7 codes linear signals to digital signals, and decodes digital signals to the original linear signals. Therefore it can operate a linear message for processing of input to storage and output for reproducing.

Basically, a telephone answering machine has two main parts, one is the outgoing message generator and the other is the incoming message recorder. Many kinds of integrated circuits are used in the application of voice synthesizers, such as Toshiba's T6668, TC8831/31F, TC8835/30/33/34, or Aharp, TI. Therefore, the voice synthesizer could be a part of the chips of a telephone answering machine.

DTMF decoder 8. In telecommunication, it is called "DTMF receiver" which transfers dual-tone multi-frequency (DTMF) signals into binary code signals (to stand for 1, 2, 3, . . . .9, 0, *, #, a, b, c, . . .), that is to be recognized by the coding system of the central processing unit. Chips such as Samsung T3170, Toshiba TC3500 may be used.

In addition, the chipsets of the fax modem/controller 2, including fax modulator/demodulator chip and fax control circuit chip in which the central processing unit is built, has been developed to perform more functions, including the voice synthesizer, DTMF receiver, and even to become mono-chip, such as Rockwell R96MFX, which is a single chip, and the R96VFX which has the DTMF receiver and voice coder/decoder (voice synthesizer) built in.

Therefore, the functions of the voice synthesizer and the DTMF decoder of the present invention can be accomplished in different ways.

As to other embodiments of the present invention, the operation is the same as described in the first embodiment, the brief description of each is as follows:

Conventional facsimile machine, having line connection to input/output port of computer:

Referring to FIG. 3, with the blocks of the structure shown at the left of the imaginary dotted line, this fax machine could operate to transfer incoming message into the storage system of computer 9. According to the preferred embodiment the voice synthesizer 7 is installed. The DTMF receiver 8 and the coding system 10 built into the central processing unit of this machine and the connection of these parts is the same as in the first embodiment. In addition, the data of the outgoing message can be stored in the storage system of the computer or stored in the additional memory integrated circuit 11 connected to the voice synthesizer 7.

Conventional facsimile machine:

As to the conventional facsimile machine, with reference to FIG. 1, the blocks of the structure are shown at the left of the imaginary line, but without the installation of mass memory 3 to store incoming message.

When this machine includes the mass memory 3, it means that this machine will operate receiving and storing at the same time when an incoming message comes In. Further, since it also has the DTMF receiver 8 and coding system 10, it becomes a self-select type facsimile machine in selection of incoming message to be printed directly or stored in the memory 3 for the individual user.

The preferred embodiment of the present invention consists of installing the mass memory 3, DTMF receiver, coding system on a conventional facsimile machine with the additional voice synthesizer as another preferred embodiment.

Figure 4:
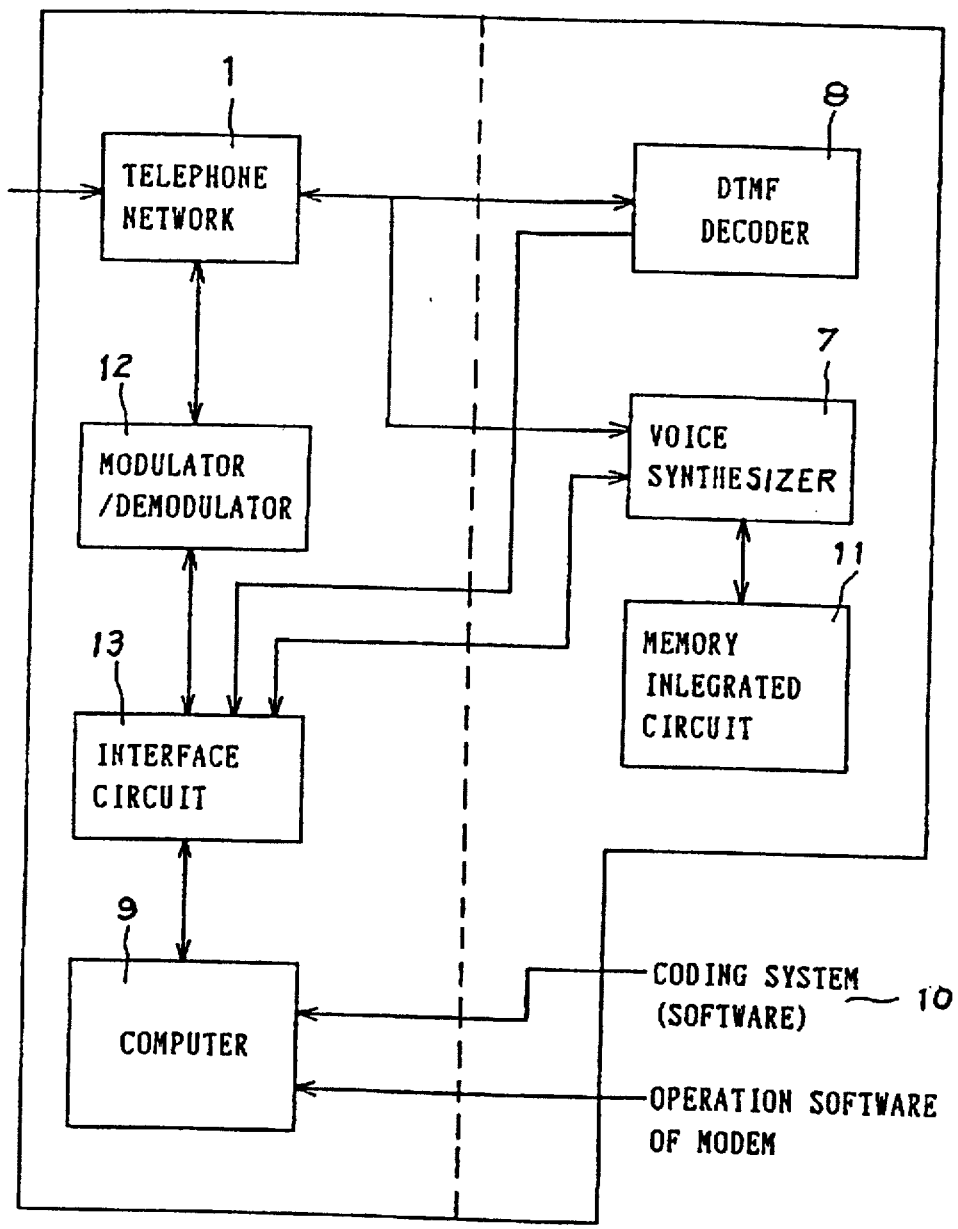
FIG. 4 is a block diagram of the present invention on MODEM-equipped computer.

Computer equipped with the modulator/demodulator of fax/data:

With reference to FIG. 4, the blocks of the structure are shown at the left of the imaginary dotted line. The incoming message from telephone line, through telephone network 1, modulator/demodulator 12, interface circuits 13 into computer 9, are controlled by operation software of the modulator/demodulator 12 which is installed in the computer for receiving and storage. The preferred embodiment of the present invention consists of installing the DTMF receiver 8, the voice synthesizer 7, both between telephone network 1 and interface circuits 13, and the software of coding system 10 is added to the operation software of modulator/demodulator 12, which is installed in the central processing unit of the computer in operation. Therefore, the manner of installation in the computer is similar to the facsimile machine discussed hereinabove. The coding system together with the voice synthesizer is an outward system to the public because it generates outgoing messages, which input from the microphone connected to the voice synthesizer or the handset connected to the telephone network for storage in the memory of the computer or in the memory integrated circuit 11 for telling the caller on the incoming telephone line about the personal information code of the individual use of the computer. Therefore, the computer will recognize (identify) the data of incoming code from the incoming telephone line and store the incoming message into specific personal memory area in the storage system of computer, and the data of the outgoing messages can be stored in the storage system of computer or stored in memory integrated circuit 11 connected to the voice synthesizer.

Figure 5:
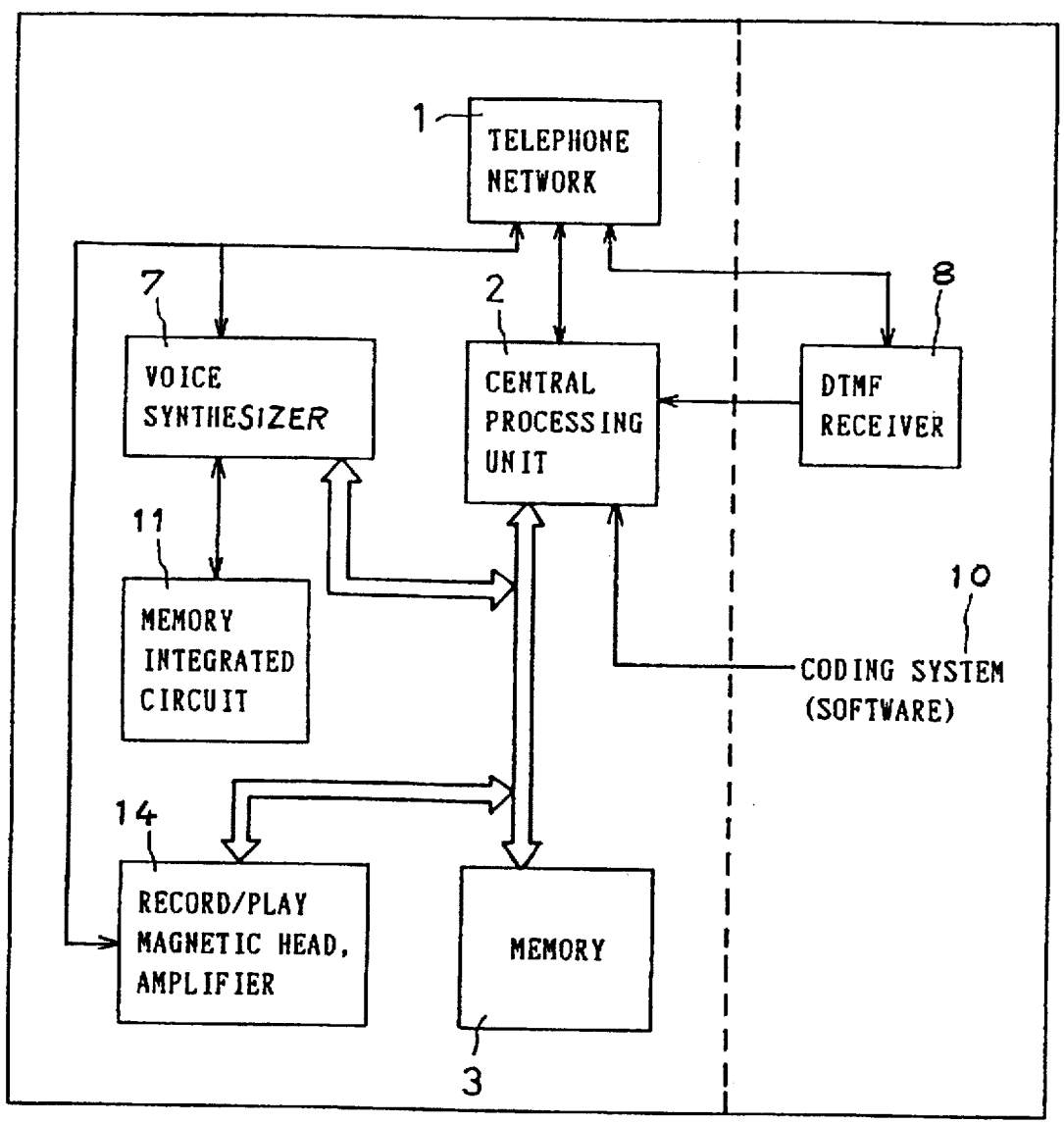
FIG. 5 is a block diagram of the present invention on an answering machine.

Conventional answering machine:

Referring to FIG. 5, the blocks shown at the left of the imaginary dotted line show the structure of the answering machine, including telephone network 1, central processing unit 2 and voice synthesizer 7 with memory 3 for digital answering machine or record/play magnetic head, amplifier 14 with memory 3 for linear answering machine. The preferred embodiment of the present invention is to install the DTMF receiver 8 between telephone network 1 and the central processing unit 2. Therefore the incoming code from telephone line is identified by the coding system, then the incoming message is stored in memory for individual use.

In the above examples, the personal message could be a voice, or a fax, or a data message in each case. Furthermore, several features related to the software of the coding system are used in all the examples of the present invention as follows:

1) Retransfer

Any individual user can set a remote telephone number, so that stored personal message can be transferred to it.

2) Remote control

Any individual user can execute remote commands (DTMF signals) at a remote place through a telephone, to revise a personal code (information code, confidential code), to revise a telephone number for transfer, to revise a phone number, page number which was expected to be transmitted when the incoming message was received and stored.

3) Voice-report on search

Any individual user can input the voice of the name that he chooses to use, and the address corresponding to the personal information code. In operation of searching the record of incoming message by entering the command (DTMF signals) over telephone line or the command from keyboard, the voice of name indicating specific personal message which has been received in memory, will be retrieved from memory and output to telephone line or to the built-in speaker.

4) Compatible in PBX system

The telephone network can add incoming lines in link with PBX system. The incoming lines are used for calling to a specific extended subscriber by transmitting the extension number (DTMF signals), which is detected in the DTMF receiver and recognized by the coding system which has been set into the extension number from keyboard as the subscriber. Then the coding system generates the signals to the built-in speaker.

What is claimed is:

1. A multi-user personal message transmitting and receiving system utilizing a paperless facsimile machine including a telephone network which receives incoming messages from a telephone line, a fax modem/controller having a central processing unit, a keyboard, a scanner, and a printer, said system comprising:

a memory means for storing a multiplicity of documents;

dual tone multi-frequency decoder means connected between the telephone network and the fax modem/controller of said paperless facsimile machine for decoding the leading incoming dual tone multi-frequency signals ahead of incoming messages into central processing unit of said fax/modem controller for recognition;

said central processing unit of said paperless facsimile machine including a coding system whereby a plurality of sets of personal codes are set by the users of said system through said keyboard, each personal code including a personal information code indicating the respective user as the addressee of an incoming message and a corresponding personal confidential code, and when an incoming message preceded by a dual tone multi-frequency signal comes through said telephone network and said dual tone multi-frequency decoder means the leading dual tone multi-frequency signal thereof is identified as designating the addressee of the incoming message by comparing the signal to the plurality of personal codes and the message is stored in said memory, said message is retrieved from said memory and printed by said printer when the personal confidential code corresponding to the user's personal information code is entered via said keyboard; and a voice synthesizer means for outgoing message generation connected between said telephone network and said fax modem/controller, said outgoing message prompting the caller on the incoming telephone line to inform the caller of the code numbers of the personal information codes of the respective users for selection, and to inform the caller to enter the personal information code of the addressee of the incoming message before the message is transmitted, said outgoing message being stored in a memory.

2. The multi-user personal message transmitting and receiving system as defined in claim 1, wherein said memory means is built into said paperless facsimile machine.

3. The multi-user personal message transmitting and receiving system as defined in claim 1, wherein said memory means comprises a computer having an input/output port connected to said paperless facsimile machine.

4. The multi-user personal message transmitting and receiving system as defined in claim 1, which further comprises means for a user to input the voice of the name he chooses to use and store the same in said memory, the voice of the name inputted corresponding to the user's personal code, and means whereby upon entering a remote command (DTMF signal) over the telephone line or a command from keyboard a personal message associated with said voice of the name chosen will be retrieved from said memory and outputted to the telephone line or a built-in speaker.

5. The multi-user personal message transmitting and receiving system as defined in claim 1, wherein said memory comprises memory integrated circuits connected to said voice synthesizer.

6. The multi-user personal message transmitting and receiving system as defined in claim 1, which further comprises means to transfer an incoming message stored in said memory to a remote telephone number previously set into said coding system from said keyboard.

7. The multi-user personal message transmitting and receiving system as defined in claim 6, which further comprises means permitting a user to execute remote commands in dual tone multi-frequency signals via a remote telephone to revise personal code, revise telephone number for transfer of incoming message, telephone number to be informed when an incoming message is received in said memory.

* * * * *